US009373970B2

(12) United States Patent
Feuerstack et al.

(10) Patent No.: US 9,373,970 B2
(45) Date of Patent: Jun. 21, 2016

(54) SYSTEM FOR CHARGING AN ENERGY STORE, AND METHOD FOR OPERATING THE CHARGING SYSTEM

(75) Inventors: Peter Feuerstack, Ludwigsburg (DE); Erik Weissenborn, Stuttgart (DE); Martin Kessler, Gmuend (DE)

(73) Assignee: ROBERT BOSCH GMBH, Stuttgart (DE)

(*) Notice: Subject to any disclaimer, the term of this patent is extended or adjusted under 35 U.S.C. 154(b) by 284 days.

(21) Appl. No.: 13/825,233

(22) PCT Filed: Aug. 25, 2011

(86) PCT No.: PCT/EP2011/064610
§ 371 (c)(1),
(2), (4) Date: Jun. 5, 2013

(87) PCT Pub. No.: WO2012/038183
PCT Pub. Date: Mar. 29, 2012

(65) Prior Publication Data
US 2013/0249474 A1 Sep. 26, 2013

(30) Foreign Application Priority Data
Sep. 20, 2010 (DE) .......................... 10 2010 041 074

(51) Int. Cl.
*H02J 7/00* (2006.01)
*B60L 11/18* (2006.01)
*H02J 7/14* (2006.01)

(52) U.S. Cl.
CPC .................. *H02J 7/007* (2013.01); *B60L 11/18* (2013.01); *B60L 11/1803* (2013.01);
(Continued)

(58) Field of Classification Search
CPC ............ B60L 11/1866; B60L 11/1855; B60L 2230/10

USPC ......................................................... 320/122
See application file for complete search history.

(56) References Cited

U.S. PATENT DOCUMENTS 3,586,954 A * 6/1971 Carves .......................... 320/137
4,585,983 A * 4/1986 Cooper ................... H02P 6/187
318/722
(Continued)

FOREIGN PATENT DOCUMENTS

CN 1662404 A 8/2005
CN 101472759 7/2009
(Continued)

*Primary Examiner* — Samuel Berhanu
*Assistant Examiner* — Tarikh Rankine
(74) *Attorney, Agent, or Firm* — Norton Rose Fulbright US LLP

(57) ABSTRACT

A system for charging at least one energy reservoir cell in a controllable energy reservoir serving to control/supply electrical energy to an n-phase electrical machine (n≥2). The controllable energy reservoir has n parallel energy supply branches each having at least two series connected energy reservoir modules, each encompassing at least one electrical energy reservoir cell having an associated controllable coupling unit, are connected to a reference bus, and are connected to a respective phase of the machine. As a function of control signals, the coupling units interrupt the respective energy supply branch or bypass the associated reservoir cells or switch the associated reservoir cells into the respective energy supply branch. To charge at least one cell, at least two phases of the machine are connectable via at least one respective free-wheeling diode to a negative pole of a charging device. The reference bus is connectable to the negative pole of the device. Those energy supply branches connected to those phases which are connectable to the negative pole of the device each have a contact point disposed between two energy reservoir modules and is connectable via at least one free-wheeling diode to a positive pole of the device.

5 Claims, 2 Drawing Sheets

(52) U.S. Cl.
CPC ........ *B60L 11/1814* (2013.01); *B60L 11/1816*
(2013.01); *B60L 11/1864* (2013.01); *H02J*
*7/0024* (2013.01); *H02J 7/0055* (2013.01);
*H02J 7/1492* (2013.01); *B60L 2220/54*
(2013.01); *H02J 7/0013* (2013.01); *H02J*
*2007/0059* (2013.01); *H02J 2007/0067*
(2013.01); *Y02E 10/766* (2013.01); *Y02T*
*10/641* (2013.01); *Y02T 10/7005* (2013.01);
*Y02T 10/7033* (2013.01); *Y02T 10/7055*
(2013.01); *Y02T 10/7061* (2013.01); *Y02T*
*10/7072* (2013.01); *Y02T 10/7094* (2013.01);
*Y02T 10/92* (2013.01); *Y02T 90/127* (2013.01);
*Y02T 90/14* (2013.01)

(56) References Cited

U.S. PATENT DOCUMENTS

| | | | | |
|---|---|---|---|---|
| 5,504,414 | A | * | 4/1996 | Kinoshita .................... 180/65.8 |
| 5,744,936 | A | * | 4/1998 | Kawakami .................... 320/120 |
| 5,883,484 | A | * | 3/1999 | Akao ........................... 318/700 |
| 6,058,032 | A | * | 5/2000 | Yamanaka .......... B60L 11/1803 318/768 |
| 8,390,259 | B2 | * | 3/2013 | Dommaschk et al. ........ 320/166 |
| 2006/0080012 | A1 | * | 4/2006 | Nishina et al. ................. 701/36 |
| 2009/0002903 | A1 | * | 1/2009 | Uchida ............................ 361/49 |
| 2009/0146612 | A1 | | 6/2009 | Oyobe et al. |
| 2010/0007293 | A1 | | 1/2010 | Meadors et al. |
| 2010/0060235 | A1 | * | 3/2010 | Dommaschk ......... H02M 7/483 320/128 |
| 2010/0097031 | A1 | * | 4/2010 | King et al. .................... 320/109 |

FOREIGN PATENT DOCUMENTS

| | | | |
|---|---|---|---|
| CN | 101584109 | | 11/2009 |
| CN | 101729020 | A | 6/2010 |
| CN | 102114788 | | 7/2011 |
| CN | 201914107 | | 8/2011 |
| DE | 41 07 391 | | 9/1992 |
| DE | 10 2007 009217 | | 8/2008 |
| DE | 10 2010 027857 | | 10/2011 |
| DE | 10 2010 027861 | | 10/2011 |
| EP | 0053414 B1 | * 5/1985 | ................ B60L 7/14 |
| EP | 0 950 559 | | 10/1999 |
| WO | 2008/086760 | | 7/2008 |

* cited by examiner

SYSTEM FOR CHARGING AN ENERGY STORE, AND METHOD FOR OPERATING THE CHARGING SYSTEM

FIELD OF THE INVENTION

The present invention relates to a system for charging an energy reservoir, and to a method for operating the charging system.

BACKGROUND INFORMATION

It is becoming apparent that in the future, both for stationary applications such as wind power installations and in vehicles such as hybrid or electric vehicles, increasing use will be made of electronic systems that combine new energy storage technologies with electrical drive technology. In conventional applications an electrical machine, which is embodied e.g. as a phase-sequence machine, is controlled via a converter in the form of an inverter. A characteristic of such systems is a so-called DC link circuit through which an energy reservoir, usually a battery, is connected to the DC voltage side of the inverter. In order to be able to meet the demands of a particular application in terms of power output and energy, multiple battery cells are connected in series. Because the current furnished by an energy reservoir of this kind must flow through all the battery cells, and because a battery cell can conduct only a limited current, battery cells are often additionally connected in parallel in order to increase the maximum current.

A series circuit of multiple battery cells yields not only a high total voltage but also the problem that the entire energy reservoir fails if a single battery cell fails, since battery current can then no longer flow. Such a failure of the energy reservoir can result in failure of the entire system. In a vehicle, a failure of the drive battery can leave the vehicle "stranded." In other applications, for example rotor blade adjustment of wind power installations, unfavorable boundary conditions such as, for example, high wind can in fact lead to hazardous situations. A high level of reliability of the energy reservoir is therefore always desirable, "reliability" referring to the ability of a system to operate in fault-free fashion for a predetermined time.

Patent Applications DE 10 2010 027857 and DE 10 2010 027861 discuss batteries having multiple battery module sections that are connectable directly to an electrical machine. The battery module sections have a plurality of battery modules connected in series, each battery module having at least one battery cell and an associated controllable coupling unit that makes it possible, as a function of control signals, to interrupt the respective battery module section or bypass the respectively associated at least one battery cell or switch the respectively associated at least one battery cell into the respective battery module section. By appropriate application of control to the coupling units, e.g. with the aid of pulse width modulation, it is also possible to furnish suitable phase signals in order to control the electrical machine, so that a separate pulse width modulated inverter can be omitted. The pulse width modulated inverter required in order to control the electrical machine is thus, so to speak, integrated into the battery. For purposes of disclosure, these two earlier applications are incorporated in their entirety into the present application.

SUMMARY OF THE INVENTION

The exemplary embodiments and/or exemplary methods of the present invention provide a system for charging at least one energy reservoir cell in a controllable energy reservoir which serves to control and supply electrical energy to an n-phase electrical machine where $n \geq 2$. The controllable energy reservoir has n parallel energy supply branches that each have at least two energy reservoir modules, connected in series, that each encompass at least one electrical energy reservoir cell having an associated controllable coupling unit. The energy supply branches are connectable on the one hand to a reference potential—hereinafter referred to as a "reference bus"—and on the other hand to a respective phase of the electrical machine. As a function of control signals, the coupling units either interrupt the respective energy supply branch or bypass the respectively associated energy reservoir cells or switch the respectively associated energy reservoir cells into the respective energy supply branch. In order to enable charging of at least one of the energy reservoir cells, a negative pole of a charging device is connectable via at least one respective free-wheeling diode to at least two phases of the electrical machine. The negative pole of the charging device is also connectable to the reference bus. In addition, those energy supply branches which are connected to those phases which are connectable to the negative pole of the charging device each have a contact point that is disposed between two energy reservoir modules and is connectable via at least one free-wheeling diode to a positive pole of the charging device. The charging device can then make available a DC voltage for charging at least one energy reservoir cell.

The exemplary embodiments and/or exemplary methods of the present invention furthermore provide a method for operating a charging system according to the present invention for an n-phase electrical machine where $n \geq 2$. At least two phases of the electrical machine, where $n \geq 2$, are electrically connected via at least one respective free-wheeling diode to the negative pole of the charging device. The reference bus is also connected to the negative pole of the charging device. In addition, the contact points are connected via at least one respective free-wheeling diode to the positive pole of the charging device. All coupling units that are associated with energy reservoir cells to be charged are controlled in such a way that the respectively associated energy reservoir cells are switched into the energy supply branch. All coupling units that are located in the energy supply branch of energy reservoir cells to be charged, but are not themselves associated with any energy reservoir cells to be charged, are controlled in such a way that the respectively associated energy reservoir cells are bypassed. At least one energy supply branch having a contact point and having no energy reservoir cells to be charged then serves as a control branch, where at least one coupling unit that is located in a control branch between the contact point and that phase of the electrical machine which is connected to the control branch has control applied to it in such a way that, alternately, the respectively associated energy reservoir cells are bypassed or the control branch is interrupted. All remaining coupling units of the control branch that are located between the contact point and that phase of the electrical machine which is connected to the control branch have control applied to them in such a way that the respectively associated energy reservoir cells are bypassed. All remaining coupling units are controlled in such a way that the respective energy supply branch is interrupted.

The exemplary embodiments and/or exemplary methods of the present invention are based on the fundamental aspect of co-utilizing the coupling units on the one hand, and the stator windings of the electrical machine on the other hand, for a charging function. This is realized by the fact that the coupling units and the stator windings are operated, in a charging phase, analogously to a step-down converter, where at least one energy supply branch that is connected to the charging device and does not itself have any energy reservoir cells to be charged serves as a control branch. The level of the output voltage of the "step-down converter" is then established by corresponding application of control, for example by pulse width modulation of the control application signal, to at least one coupling unit that is located between the contact point of the control branch and that phase of the electrical machine which is connected to the control branch. This involves only minimal additional hardware outlay for the requisite free-wheeling diodes, which is consistent with low cost and little space requirement.

The systems and methods according to the present invention make possible both the charging of energy reservoir cells of an individual energy reservoir module, and simultaneous charging of energy reservoir cells of multiple energy reservoir modules. In the case of an at least three-phase electrical machine, the energy reservoir cells of energy reservoir modules that are located in different energy supply branches can also be charged simultaneously.

If multiple energy supply branches that are connected via a contact point to the positive pole of the charging device and do not themselves have any energy reservoir cells to be charged are available, then either only one of these energy supply branches can be used as a control branch, or multiple or all such energy supply branches can also take on the function of a control branch. The use of multiple parallel control branches offers the advantage that lower on-state resistance values can thereby be achieved.

For usability of the exemplary embodiments and/or exemplary methods of the present invention it is sufficient that a single coupling unit that is located in a control branch between the contact point and that phase of the electrical machine which is connected to the control branch have control applied to it in such a way that, alternately, the respectively associated energy reservoir cells are bypassed or the control branch is interrupted. Alternatively to this, however, multiple or all coupling units that are located in the control branch between the contact point and that phase of the electrical machine which is connected to the control branch can also have control applied to them correspondingly.

The purpose of the charging device is merely to make available a suitable DC voltage. The charging device can in that regard be implemented in a variety of ways. It can be configured, for example, as a grid-connected charging device. It is also immaterial in this context, with regard to the usability of the exemplary embodiments and/or exemplary methods of the present invention, whether the grid-connected charging device is single- or three-phase, or whether it is configured to be galvanically isolated or nonisolated. If the charging device encompasses a DC voltage converter (DC/DC converter), the latter can be configured for a fixed output voltage as a result of the additional adaptation stage that is created by the coupling units and stator windings operated as a step-down converter; this has an advantageous effect on its efficiency, volume, and cost.

According to an embodiment of the present invention, provision is made that the negative pole of the charging device is connectable via at least one respective free-wheeling diode to all phases of the electrical machine, and all energy supply branches have a respective contact point that is disposed between two energy reservoir modules and is connectable via at least one free-wheeling diode to the positive pole of the charging device. In this manner, at least two parallel control branches are always available for charging the energy reservoir cells in only one energy supply branch, with the result that lower on-state resistance values can be achieved.

Undesired torques during the charging operation can be avoided by mechanically blocking the electrical machine during the charging operation, for example with the aid of a linkage detent pawl. Alternatively, the rotor position of the electrical machine can also be monitored, for example with the aid of a corresponding sensor suite, and shut off in the event a rotor motion is detected.

If the inductances of the stator windings of the electrical machine are not sufficient, an additional charging inductance can be inserted between the charging device and the electrical machine, or between the charging device and the controllable energy reservoir.

Further features and advantages of embodiments of the present invention are evident from the description below with reference to the appended drawings.

DETAILED DESCRIPTION

Figure 1:
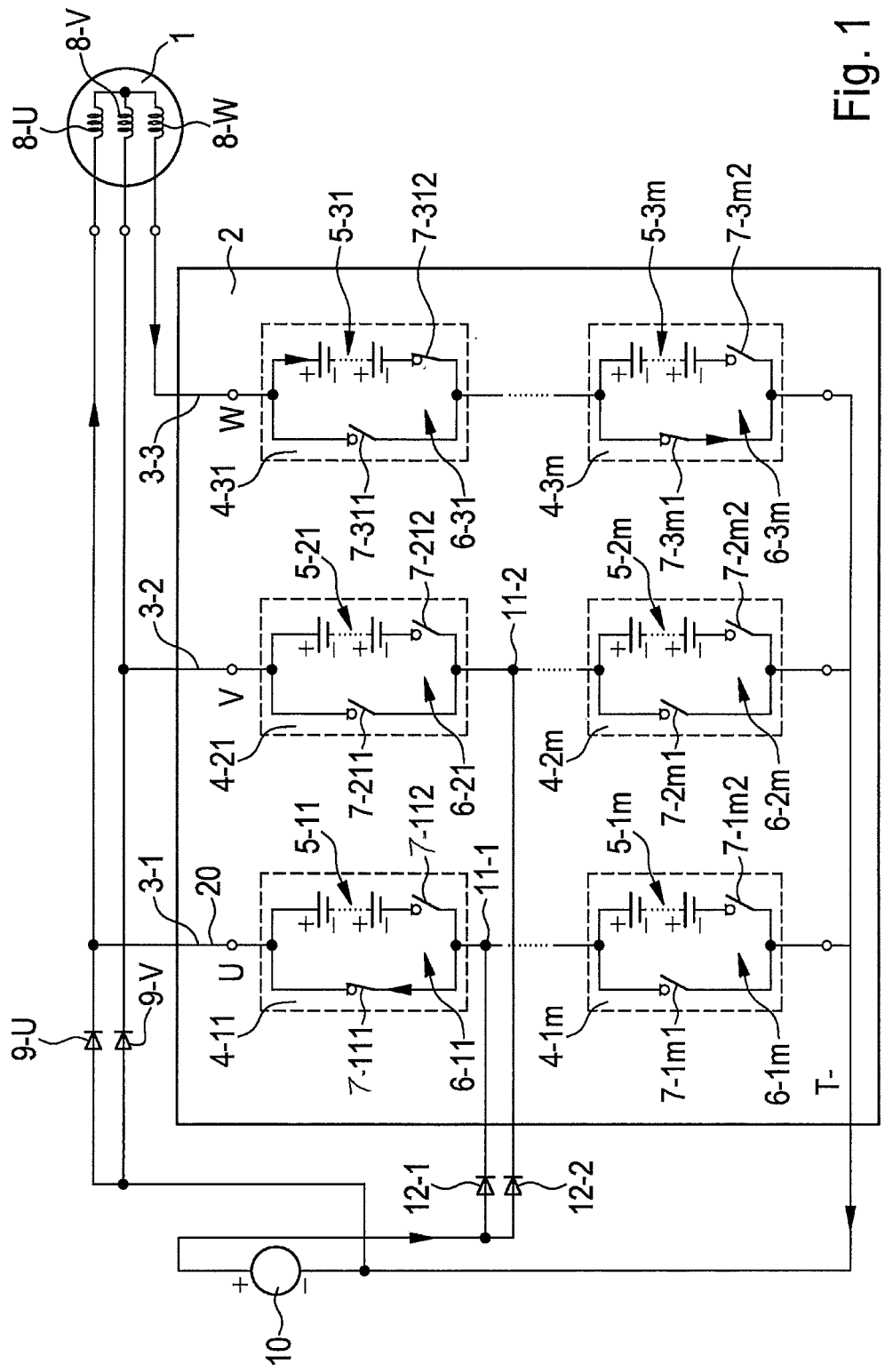
FIG. 1 schematically depicts a charging system according to the present invention in a charging phase.
Figure 2:
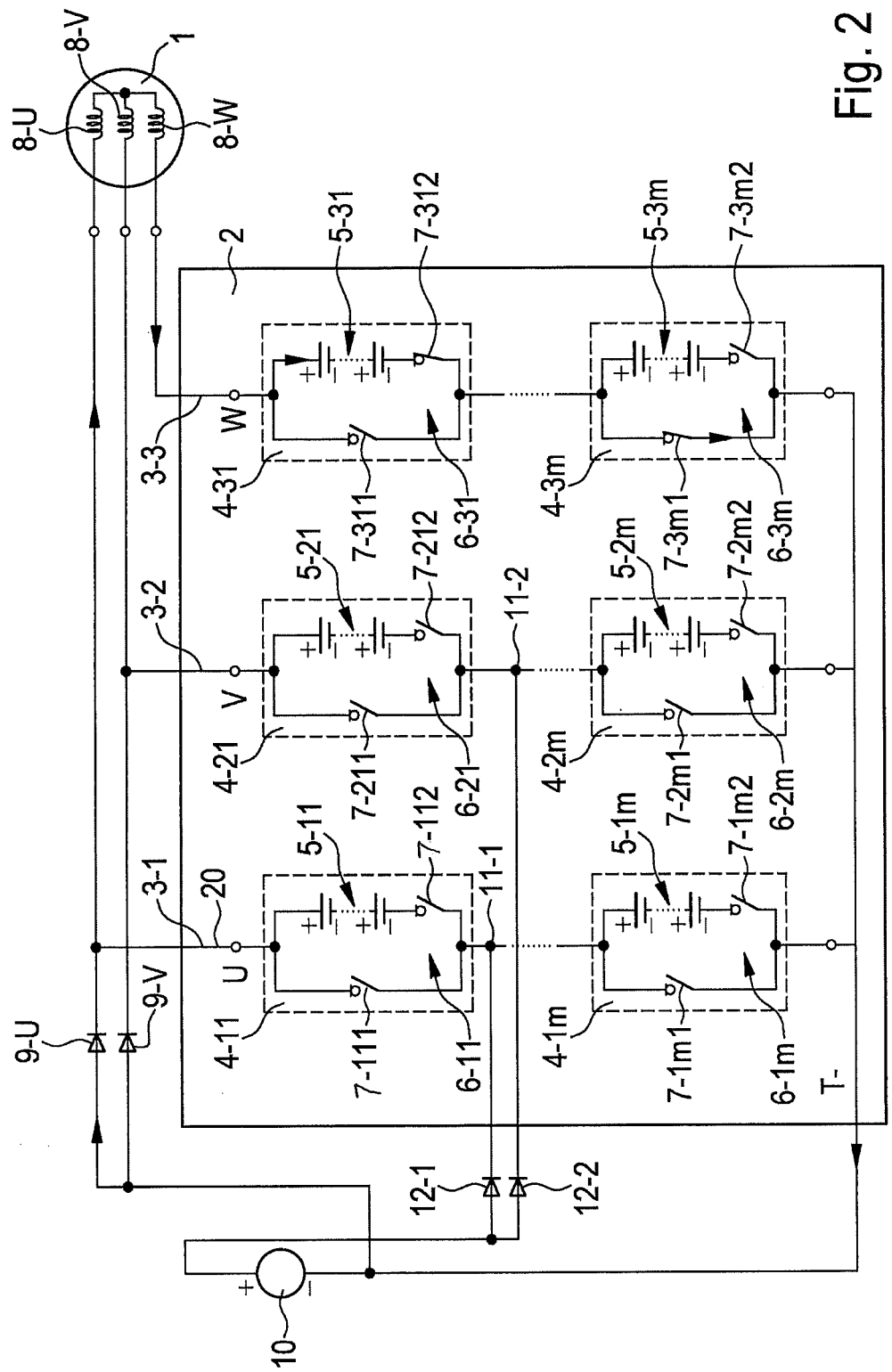
FIG. 2 shows the charging system according to FIG. 1 in a free-wheeling phase.

FIGS. 1 and 2 schematically depict a charging system according to the present invention. A controllable energy reservoir 2 is connected to a three-phase electrical machine 1. Controllable energy reservoir 2 encompasses three energy supply branches 3-1, 3-2, and 3-3, which are connected on the one hand to a reference potential T− (reference bus) that, in the embodiment depicted, carries a low potential, and on the other hand respectively to individual phases U, V, W of electrical machine 1. Each of energy supply branches 3-1, 3-2, and 3-3 has, connected in series, m energy reservoir modules 4-11 to 4-1$m$, 4-21 to 4-2$m$, and 4-31 to 4-3$m$ respectively, where m≥2. Energy reservoir modules 4 in turn each encompass multiple respective electrical energy reservoir cells 5-11 to 5-1$m$, 5-21 to 5-2$m$, 5-31 to 5-3$m$ connected in series. Energy reservoir modules 4 furthermore each encompass a respective coupling unit 6-11 to 6-1$m$, 6-21 to 6-2$m$, 6-31 to 6-3$m$ that is associated with energy reservoir cells 5 of the respective energy reservoir module 4. In the variant embodiment depicted, coupling units 6 are each constituted by two respective controllable switch elements 7-111 and 7-112 to 7-1$m$1 and 7-1$m$2, 7-211 and 7-212 to 7-2$m$1 and 7-2$m$2, and 7-311 and 7-312 to 7-3$m$1 and 7-3$m$2. The switch elements can be embodied as power semiconductor switches, e.g. in the form of insulated gate bipolar transistors (IGBTs) or as metal oxide semiconductor field-effect transistors (MOSFETs).

Coupling units 6 make it possible to interrupt the respective energy supply branch 3 by opening both switch elements 7 of a coupling unit 6. Alternatively, energy reservoir cells 5 either can be bypassed by closing one of the respective switch elements 7 of a coupling unit 6, for example by closing switch 7-311, or can be switched into the respective energy supply branch 3, for example by closing switch 7-312.

The total output voltages of energy supply branches 3-1 to 3-3 are determined by the respective switching state of the controllable switch elements 7 of coupling units 6, and can be adjusted in steps. The steps occur as a function of the voltage of the individual energy reservoir modules 4. Proceeding from the embodiment of identically configured energy reservoir modules 4, what results then as a maximum possible total output voltage is the voltage of an individual energy reservoir module 4 times the number m of energy reservoir modules 4 connected in series in each energy supply branch 3.

Coupling units 6 thus make it possible to switch phases U, V, W of electrical machine 1 toward either a high reference potential or a low reference potential, and can in that regard also perform the function of a known inverter. The power output and operating mode of electrical machine 1 can thus be controlled, with appropriate application of control to coupling units 6, by controllable energy reservoir 2. Controllable energy reservoir 2 thus performs a dual function in this regard, since it serves not only to supply electrical energy to electrical machine 1 but also to control it.

Electrical machine 1 has stator windings 8-U, 8-V and 8-W that are interconnected with one another in known fashion in a star configuration.

In the exemplifying embodiment depicted, electrical machine 1 is embodied as a three-phase rotary current machine, but it can also have fewer or more than three phases. The number of phases of the electrical machine of course also governs the number of energy supply branches 3 in controllable energy reservoir 2.

In the exemplifying embodiment depicted, each energy reservoir module 4 has multiple respective energy reservoir cells 5 connected in series. Energy reservoir modules 4 can, however, alternatively also have only a single energy reservoir cell or also energy reservoir cells connected in parallel.

In the exemplifying embodiment depicted, coupling units 6 are each constituted by two controllable switch elements 7. Coupling units 6 can, however, also be realized using more or fewer controllable switch elements, provided the necessary functions (interruption of the energy supply branch, bypassing of the energy reservoir cells, and switching of the energy supply cells into the energy supply branch) can be realized. Examples of alternative embodiments of a coupling unit are evident from the earlier Applications DE XX and DE YY. It is moreover also conceivable, however, for the coupling elements to have switch elements in a full bridge configuration, which offers the additional capability of a voltage reversal at the output of the energy reservoir module.

In order to enable the charging of energy reservoir cells 5 of one or more energy reservoir modules 4, the two phases U and V are each electrically connected, via a respective diode 9-U and 9-V, to a negative pole of a charging device 10 that is depicted in the form of an equivalent circuit diagram as a DC voltage source. Charging device 10 makes available a DC voltage suitable for charging energy reservoir cells 5, and can be embodied e.g. as a grid-connected charging device (single- or three-phase, galvanically isolated or nonisolated). The negative pole of charging device 10 is also connected to reference bus T−. Energy supply branches 3-1 and 2-2 that are connected respectively to the two phases U and V connected to charging device 10 each have a respective contact point 11-1 and 11-2 which are disposed between two respective energy reservoir modules 4 of the respective energy supply branch 3-1 and 3-2. In the exemplifying embodiment depicted concretely, the two contact points 11-1 and 11-2 are each disposed between the respective energy reservoir module 4-11 and 5-11 that is respectively closest to the phase U and V of electrical machine 1, and a subsequent respective energy reservoir module 4-12 and 4-22. Alternatively, however, contact points 11-1 and 11-2 can also be disposed between any other energy reservoir modules 4 of the respective energy supply branch. Contact points 11-1 and 11-2 are each electrically connected via a respective free-wheeling diode 12-1 and 12-2 to a positive pole of charging device 10.

The charging operation of energy reservoir cells 5 of an individual energy reservoir module 4, namely energy reservoir cells 5-31 of energy reservoir module 4-31 in energy supply branch 3-3, will be described below by way of example.

During a charging phase depicted in FIG. 1, all coupling units 6-31 that are associated with energy reservoir cells 5-31 to be charged are controlled by a control unit (not depicted) in such a way that the respectively associated energy reservoir cells 5-31 are switched into energy supply branch 3-3. This is achieved concretely by the fact that switch element 7-311 is closed, whereas switch element 7-312 is opened. All coupling units 6-32 to 6-3$m$ that are located in energy supply branch 3-3 of energy reservoir cells 5-31 to be charged, but are not themselves associated with any energy reservoir cells 5-32 to 5-3$m$ to be charged, are controlled in such a way that the respectively associated energy reservoir cells 5-32 to 5-3$m$ are bypassed. This is achieved concretely by the fact that switch elements 7-321 to 7-3$m$1 are closed, whereas switch elements 7-322 to 7-3$m$2 are opened. An energy supply branch—in the exemplifying embodiment depicted, energy supply branch 3-1—that has contact point 11-1 but has no energy reservoir cell 5 to be charged, serves as control branch 20. Coupling unit 6-11 that is located in energy supply branch 3-1 and thus in control branch 20, between contact point 11-1 and that phase U of electrical machine 1 which is disposed in the energy supply branch, has control applied to it during the charging phase in such a way that the associated energy reservoir cells 5-11 are bypassed. This is achieved concretely by the fact that switch element 7-111 is closed, whereas switch element 7-112 is opened. All remaining coupling units, i.e. in the concrete exemplifying embodiment those coupling units 6-12 to 6-1$m$ of control branch 20 which are located between contact point 11-1 and reference bus T−, and coupling units 6-21 to 6-2$m$ that are located in energy supply branch 3-2 associated with phase V, are controlled in such a way that the respective energy supply branch 3-1 and 3-2 is interrupted. This is achieved concretely by the fact that in each case both switch elements 7 of coupling units 6 are opened.

Application of control in this manner to coupling units 6 produces a current flow from charging device 10 via free-wheeling diode 12-1 and coupling unit 6-11 through stator windings 8-U and 8-W and energy reservoir cells 5-31 to be charged. Electrical energy is stored in stator windings 8-U and 8-W during the charging phase.

In a free-wheeling phase that follows the charging phase and is depicted in FIG. 2, coupling unit 6-31 that is associated with energy reservoir cells 5-31 to be charged continues to be controlled in such a way that the associated energy reservoir cells 5-31 are switched into energy supply branch 3-3. All remaining coupling units 6-32 to 6-3$m$ that are located in energy supply branch 3-3 of energy reservoir cells 5-31 to be charged, but are not themselves associated with any energy reservoir cells to be charged, continue to be controlled in such a way that the respectively associated energy reservoir cells are bypassed (switch elements 7-321 to 7-3$m$1 closed, and switch elements 7-322 to 7-3$m$2 opened). Coupling units 6-11 to 6-1$m$ and 6-21 to 6-2$m$ in the remaining energy supply branches 3-1 and 3-2 are controlled in such a way that the respective energy supply branches 3-1 and 3-2 are interrupted.

During the free-wheeling phase, the inductance of stator windings 8-U and 8-V continues to drive the current, which during the free-wheeling phase flows not via coupling unit 6-11 but instead via free-wheeling diode 9-U.

The respective charging voltage can be established by regulated alternate closing (charging phase) and opening (free-wheeling phase) of switch element 7-111, which is achievable e.g. by corresponding pulse width modulation of the control application signal.

If, in contrast to the embodiment depicted in FIGS. 1 and 2, more than one energy reservoir module 4 is disposed between contact point 11-1 of control branch 20 and the associated phase U of electrical machine 1, then either a single coupling unit, e.g. coupling unit 6-11 that is located in control branch 20 between contact point 11-1 and that phase U of electrical machine 1 which is connected to control branch 20 can continue to have control applied to it in such a way that, alternately, the respectively associated energy reservoir cells are bypassed or the control branch is interrupted. Alternatively to this, however, multiple or all coupling units 6 that are located in control branch 20 between contact point 11-1 and that phase U of electrical machine 1 which is connected to control branch 20 can also have control applied to them correspondingly.

It is moreover possible to use further energy supply branches 3, such as (in the exemplifying embodiment depicted) energy supply branch 3-2, which are connected via a contact point, for example contact point 11-2, to the positive pole of charging device 10 and do not themselves have any energy reservoir cells 5 to be charged, as control branches, with corresponding application of control to the associated coupling unit 6. The use of multiple parallel control branches offers the advantage that lower on-state resistance values can thereby be achieved.

If the motor inductances are not sufficient, an additional external charging inductance can also be used, inserted between charging device 10 and electrical machine 1 or between charging device 10 and controllable energy reservoir 2.

If the third phase W of electrical machine 1 is also connected via a free-wheeling diode (not depicted) to the negative pole of charging device 10, and if the associated energy supply branch 3-3 is also connected via a contact point (not depicted) and a free-wheeling diode (likewise not depicted) to the positive pole of the charging device, then at least two parallel control branches are always available at least for charging energy reservoir cells in only one energy supply branch. Lower on-state resistance values can thereby be achieved.

Undesired torques, during the charging operation can be avoided by mechanically blocking electrical machine 1 during the charging operation, for example with the aid of a linkage detent pawl. Alternatively, the rotor position of electrical machine 1 can also be monitored, for example with the aid of a corresponding sensor suite, and shut off in the event a rotor motion is detected.

What is claimed is:

1. A system for charging at least one energy reservoir cell in a controllable energy reservoir, which serves to control and supply electrical energy to an n-phase electrical machine, where n≥2, where the controllable energy reservoir has n parallel energy supply branches that each have at least two energy reservoir modules, connected in series, that each encompass at least one electrical energy reservoir cell having an associated controllable coupling unit, are connectable to a reference bus, and are connectable to a respective phase of the electrical machine, comprising:

a charging device having a negative pole and a positive pole, wherein as a function of control signals, the coupling units interrupt the respective energy supply branch or bypass the respectively associated energy reservoir cells or switch the respectively associated energy reservoir cells into the respective energy supply branch;

wherein the negative pole of the charging device that makes available a DC voltage for charging at least one energy cell is connectable via at least one respective free-wheeling diode to at least two phases of the electrical machine, wherein the negative pole of the charging device is connectable to the reference bus, and wherein those energy supply branches which are connected to those phases which are connectable to the negative pole of the charging device each have a contact point that is disposed between two energy reservoir modules of the respective supply branch and is connectable via at least one free-wheeling diode to the positive pole of the charging device.

2. The system of claim 1, wherein the negative pole of the charging device is connectable via at least one respective free-wheeling diode to all phases of the electrical machine, and wherein all energy supply branches have a respective contact point that is disposed between two of the energy reservoir modules of the respective supply branch and is connected via at least one of the free-wheeling diodes to the positive pole of the charging device.

3. The system of claim 1, wherein an additional charging inductance is insertable between the charging device and the electrical machine or between the charging device and the controllable energy reservoir.

4. A method for operating a charging system having a charging device for charging at least one energy reservoir cell in a controllable energy reservoir, which serves to control and supply electrical energy to an n-phase electrical machine, where n≥2, where the controllable energy reservoir has n parallel energy supply branches that each have at least two energy reservoir modules, connected in series, the method comprising:

connecting at least two phases of the n-phase electrical machine, via at least one respective free-wheeling diode to a negative pole of a charging device, connecting the reference bus to the negative pole of the charging device, wherein those energy supply branches which are connected to those phases which are connectable to the negative pole of the charging device each have a contact point that is disposed between two energy reservoir modules of the respective supply branch, and connecting the contact points via at least one respective free-wheeling diode to a positive pole of the charging device;

controlling all coupling units that are associated with energy reservoir cells to be charged so that the respectively associated energy reservoir cells are switched into the energy supply branch;

controlling all coupling units that are located in the energy supply branch of energy reservoir cells to be charged, but are not themselves associated with any energy reservoir cells to be charged, so that the respectively associated energy reservoir cells are bypassed, wherein at least one energy supply branch having a contact point and having no energy reservoir cell to be charged serves as a control branch, where at least one coupling unit that is located in the control branch between the contact point and that phase of the electrical machine which is connected to the control branch has control applied to it so that, alternately, the respectively associated energy reservoir cells are bypassed or the control branch is interrupted;

controlling all remaining ones of the coupling units of the control branch that are located between the contact point and that phase of the electrical machine which is connected to the control branch so that the respectively associated energy reservoir cells are bypassed; and controlling all remaining ones of the coupling units so that the respective energy supply branch is interrupted.

5. The method of claim 4, wherein the alternate bypassing of the respectively associated energy reservoir cells or interruption of the control branch is achieved by pulse width modulation of a control application signal of the at least one coupling unit that is located in a control branch between the contact point and that phase of the electrical machine which is connected to the control branch.

* * * * *